US005738394A

United States Patent [19]

Arabia, Jr. et al.

[11] Patent Number: 5,738,394

[45] Date of Patent: Apr. 14, 1998

[54] CHILD-PROOF DOOR LATCH

[75] Inventors: Frank Joseph Arabia, Jr., Macomb Township, Mich.; Colby Lenn Bellew, Berkeley, Calif.; Ian Martin, Pontiac, Mich.

[73] Assignee: General Motors Corporation, Detroit, Mich.

[21] Appl. No.: 756,021

[22] Filed: Nov. 26, 1996

[51] Int. Cl.$^{6}$ .............................. E05C 3/06; E05C 3/16; B60R 25/00

[52] U.S. Cl. .................. 292/216; 292/225; 292/DIG. 25; 292/DIG. 27; 70/256

[58] Field of Search .................................... 292/125, 141, 292/200, 216, 217, 225, DIG. 25, DIG. 27, DIG. 65; 70/256; 74/471 R

[56] References Cited

U.S. PATENT DOCUMENTS

| | | | |
|---|---|---|---|
| 4,045,064 | 8/1977 | Okada | 292/125 |
| 4,633,724 | 1/1987 | Mochida | 74/471 R |
| 4,929,007 | 5/1990 | Bartczak et al. | 292/DIG. 27 |
| 5,476,294 | 12/1995 | Menke | 292/216 |
| 5,531,489 | 7/1996 | Cetnar | 292/DIG. 25 |
| 5,647,234 | 7/1997 | Foster | 70/256 |

*Primary Examiner*—Neill R. Wilson

*Attorney, Agent, or Firm*—Lawrence B. Plant

[57] ABSTRACT

A child-proof door latch including a selector switch accessable from the door's exterior for enabling or disabling the functioning of a cable-driven latch of the type where a sheath about the cable pushes on the latches trigger to actuate the latchbolt. The selector switch includes a slot which controls the anchoring or movement of the end of the cable which, in turn, permits or prevents the tensioning of the cable sufficiently to straighten the sheath thereabout for actuating the trigger.

7 Claims, 2 Drawing Sheets

CHILD-PROOF DOOR LATCH

TECHNICAL FIELD

This invention relates generally to cable-driven door latches for vehicles, and more particularly to child-proof such latches of the type where the sheath encasing the cable actuates the latch's trigger.

BACKGROUND OF THE INVENTION

Vehicle door latches are well known in the art and serve to prevent unintended opening of the door. Latching mechanisms comprise various combinations of springs, gears, cams, levers, pivots and other such linkages, coacting to provide latching, unlatching locking and unlocking functions, which mechanisms are well known in the art. The structural details of such mechanisms can be found in numerous patents including Garwood U.S. Pat. No. 4,756,563 and copending U.S. patent application U.S. Ser. No. 08/707,467 filed Sep. 4, 1996, both of which are assigned to the assignee of the present invention. Moreover, such mechanisms can be found in latches sold commercially by the General Motors Corporation, assignee of the present invention, as well as other vehicle manufacturers. The aforesaid patents and commercial latches are intended to be incorporated herein by reference. One such latching mechanism actuates the door latch by a cable system including a cable encased in a flexible sheath/conduit which is coupled to a handle located remotely from the latch (hereafter cable-driven latches). Conventional cable-driven latches typically include a latchbolt (e.g., a rotateable fork-bolt) which is actuated by an operating lever (hereinafter trigger) which in turn is actuated by the cable which is tensioned by pulling or rotating the handle.

An improved cable-driven latch is disclosed in copending U.S. patent application U.S. Ser. No. (Attorney's Docket No. H-196126), filed concurrently herewith, which is assigned to the assignee of the present invention, and is intended to be incorporated herein by reference. In that patent application, a cable-driven door latch has a theft-deterring, cable system wherein the sheath encasing the cable pushes on the trigger to actuate the latchbolt, rather than the cable pulling on the trigger. Disclosed therein is a sheath-actuated, cable-driven door latch and handle mechanism comprising a latchbolt for engaging a striker on a doorframe, a trigger for actuating the latchbolt, and a handle remote from the trigger for actuating the trigger (i.e., via the cable system). A flexible cable extends between the handle and the door latch, and is encased in a flexible sheath which has sufficient longitudinal incompressibility that it can press on and move the trigger without significantly yielding or collapsing under the load. One end of the cable is affixed to the handle for movement therewith while the other end of the cable is anchored adjacent the trigger so as to prevent longitudinal movement of the cable end. One end of the sheath is anchored to a structure supporting the handle and adjacent the first end of said cable so as to prevent movement of such sheath end. The other end of the sheath is affixed to the latch trigger. The sheath extends between the trigger and the handle by an arcuate path. Tensioning of the cable by pulling on or rotating the handle causes the sheath to straighten out sufficiently that the end of the sheath affixed to the trigger is caused to move toward the end of the cable anchored adjacent thereto and in so doing to push upon the trigger and actuate the latchbolt.

Child-proof door latches are also well known in the art and are disclosed in Portelli et al U.S. Pat. No. 4,969,673 issued Nov. 13, 1990 and assigned to the assignee of the present invention, as well as in latches sold commercially by the General Motors Corporation and other vehicle manufacturers. Such devices typically include a rotateable selector switch including a fingertab protruding through an edge-panel of the door for selectively enabling or disabling the latch, e.g., by blocking/unblocking rotation of the trigger that actuates the latchbolt.

SUMMARY OF THE INVENTION

The present invention involves a cable-driven door latch of the sheath-actuated type such as disclosed in copending U.S. patent application U.S. Ser. No. H-196126, supra, which is selectively child-proofed by selectively trapping or releasing the end of the cable adjacent the latch's trigger to restrict or allow movement thereof relative to the end of the sheath connected to the latch's trigger. More specifically, the invention contemplates a cable-driven door latch and handle mechanism comprising a latchbolt for engaging a striker on a doorframe (e.g., door jamb) to prevent unintended opening of the door associated with the latch, and a trigger for actuating the latchbolt. A handle remote from the trigger actuates the trigger via a flexible, sheathed cable extending therebetween wherein the sheath encasing the cable pushes on the trigger when the cable is tensioned by the handle. A first end of the cable is affixed to the handle for movement therewith, and a first end of the sheath is anchored against movement adjacent the first end of the cable. A second end of the sheath is attached to the trigger. To provide selective childproofing of the door latch, the second end of the cable is selectively (1) trapped so as to prevent longitudinal movement thereof relative to the second end of the sheath when the ability to actuate the trigger by the sheath is enabled, or (2) released for longitudinal movement when the ability to actuate the trigger by the sheath is disabled. Preferably, a selector switch is provided which engages a slideable fitting on the second end of the cable for selectively trapping or releasing the second cable end to respectively enable or disable the latch from actuation by the handle. The selector switch is preferably a lever mounted on the door, and rotateable between cable-trapping (i.e., latch enabled) and cable-releasing (i.e., latch disabled) positions. The switch includes a slot through which a slideable fitting on the end of the cable slides when the ability to actuate the trigger by the sheath is disabled. The slot in the switch has a free end adjacent the trigger and a cable-trapping end opposite the free end for so trapping the second end of the cable as to prevent movement thereof when the ability to actuate the trigger by the sheath is enabled. Preferably, the door includes an edge-panel that has a second slot therein proximately abreast of the first slot, which second slot is defined by a pair of walls between which the fitting slides when the first and second slots are aligned in substantially the same direction and the ability to actuate the trigger is disabled. Alternatively, the second slot could be formed in the mounting frame for the latch. A recess is provided in one of the second slot's walls, adjacent the trapping end of the first slot, which recess receives and retains the slideable fitting on the second end of the cable against movement in the slots when the ability to actuate the trigger by the sheath is enabled. In this regard, the fitting is held in the recess by the trapping end of the first slot when the switch is rotated such that the first and second slots are misaligned sufficiently to prevent movement of the slideable fitting in the slots. The second slot is preferably in the floor of a depression formed in the edge-panel of the door. A fingertab on the switch extends through an opening in the edge-panel for manually moving the switch between the cable-trapping and cable-releasing positions.

BRIEF DESCRIPTION OF THE DRAWINGS

The invention will better be understood when considered in the light of the following detailed description of a specific embodiment thereof which is given hereafter in connection with the several drawings of which.

DESCRIPTION OF THE PREFERRED EMBODIMENT

Figure 1:
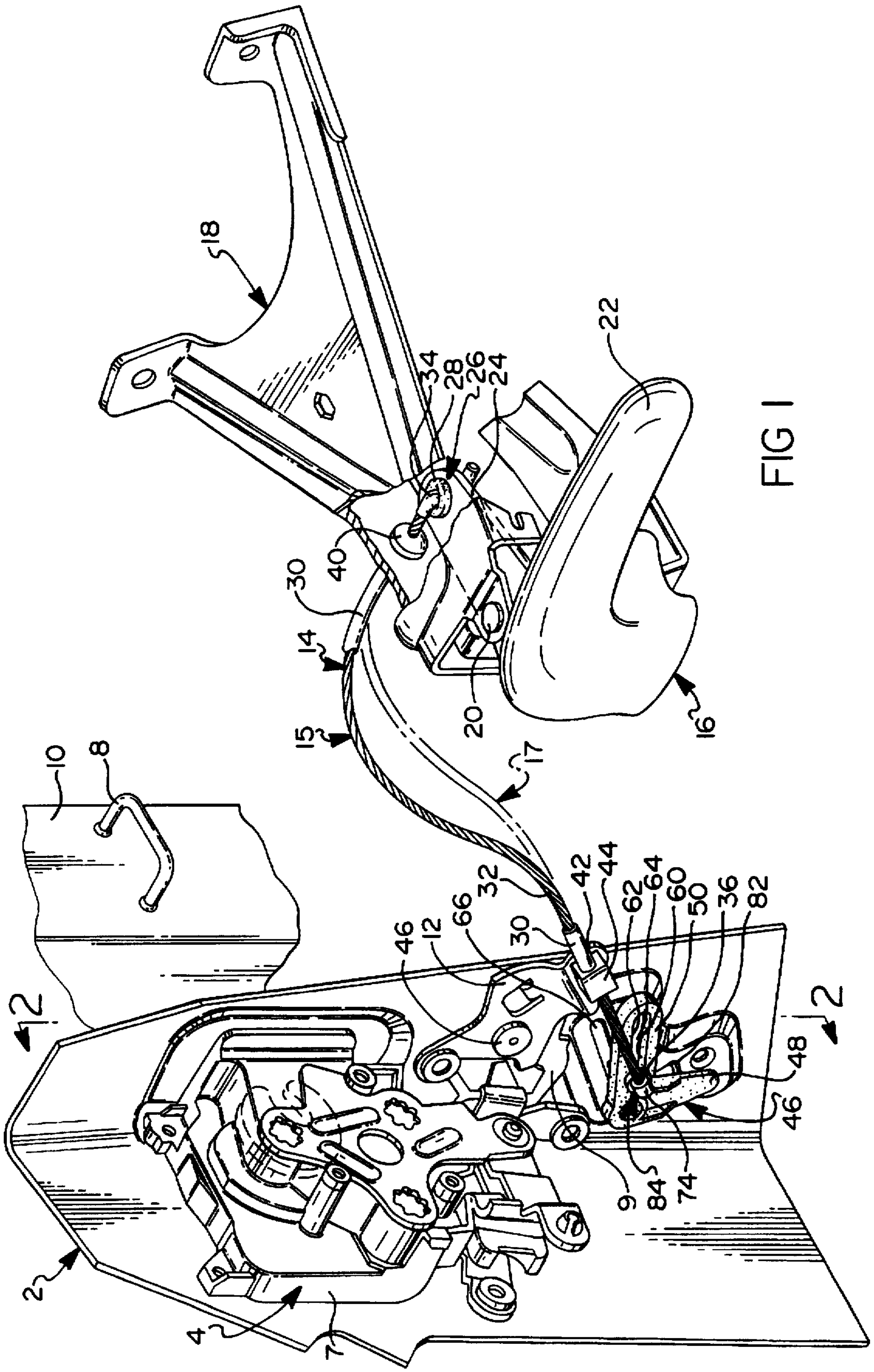
FIG. 1 is a partially broken away isometric view, from a first direction, of a child-proof latch, cable system and handle mechanism according to the present invention wherein latching is enabled.

The Figures show the interior of a vehicle door 2 supporting a latching mechanism 4 preferably including a rotateable latchbolt 6 contained within a plastic housing 7 mounted on a frame member 9, and adapted to engage a striker 8 on a door jamb 10 of a vehicle, such as described in the above-referenced patents. The mounting frame 9 carries the housing 7 as well as the several other linkages of the latch such that the latch 4 can be preassembled and then attached as a unit to the door 2. The latchbolt 6 preferably takes the form of a fork-bolt and engages the striker 8 when the door 2 is in the closed position so as to retain the door 2 in such position against unintended opening thereof. To open the door 2, the latchbolt 6 is caused to rotate so as to disengage the striker 8 by actuation of the latchbolt 6 by an operating lever (hereinafter trigger 12). The trigger 12 may either directly actuate the latchbolt 6, or indirectly actuate the latchbolt 6 via appropriate linkages therebetween as are well known in the art and are not themselves part of the present invention. The trigger 12 is actuated by a cable system 14 which extends from the trigger 12 to a remotely located handle 16 carried by a support 18 which may either be (1) a part of the door 2 or (2) a separate piece secured to the door 2, as shown. The handle 16 is rotateable about a spindle 20, and includes (1) a grasping portion 22 which is manipulated by the vehicle entrant, and (2) a lever portion 24 integral with, and extending at an angle to, the grasping portion 22 inwardly of the door 2. The lever portion 24 has an aperture 26 therein which carries a plastic grommet 28 which, in turn, receives an end 34 of the cable 32.

The cable system 14 comprises a sheath 30 and a cable 32 which slides longitudinally within the sheath 30. A first end 34 of the cable 32 is attached in the grommet 28 (e.g., by bending), so as to be rotateable therein when the grasping portion 22 is moved outwardly and the lever portion 24 correspondingly moved away from the leg 23 of the support 18. The sheath 30 has a first end 40 anchored against movement to the handle support 18 adjacent the first end 34 of the cable 32. The second end 42 of the sheath is affixed to the trigger 12 via a junction block 44 which rotates through a limited angle as the trigger 12 rotates about a spindle 46. The cable system 14 is flexible transverse its length, and extends between the handle support 18 and the trigger 12 in a first arcuate path 15 (shown in solid lines) characterized by a first radius when the handle 16 is in its normal resting position.

According to the present invention, child-proofing of the latch is accomplished by anchoring the second end 36 of the cable 32 against longitudinal movement when the ability to actuate the trigger by the sheath is enabled, and releasing the second end 36 of the cable 32 for longitudinal movement with respect to the sheath 30 when the ability to actuate the trigger 12 is disabled. To this end, there is provided a selector switch 46 which has an actuating arm 48 for moving the switch from one position to another and an effectuating arm 50 for effecting the trapping or releasing of the end 36 of the cable 32, as needed, to enable or disable the latch respectively.

The switch 46 rotates about an hollow knob 52 formed integrally therewith, which hollow knob 52 has a plurality of slits 54 therein for allowing the knob 52 to both collapse inwardly, and thence expand outwardly for snap-fitting the knob 52 into an aperture in the edge-panel 58 of the door 2. The effectuating arm 50 of the switch 46 includes a pair of parallel walls 60 and 62 defining a first slot 64 through which the end 36 of the cable 32 slides for disabling the latch 4. The first slot 64 cooperates with a second slot 66 which is formed through the edge-panel 58 and is defined by upper wall 68 and lower wall 70. A recess 72 is formed in the lower wall 70 at the lower end of the second slot 66 for trapping the second end 36 of the cable 32 therein, as described hereinafter. More specifically, the second end 36 of the cable 32 has a fitting 74 secured thereto which, in turn, includes a stud 76 which slides in the slots 64 and 66. An elongated cap 78 is formed integral with, or is affixed to, the stud 76 to retain the stud 76 in the slots 64 and 66 under normal operating conditions, but which may be rotated such that its longitudinal axis is parallel to the slots 64 and 66 for positioning the stud 76 in, or removal thereof from, the slots 64 and 66.

A fingertab 80 is attached to the actuating arm 48, and extends through an opening 82 in the edge-panel 58 for manually tripping the switch 46. The opening is sufficiently large as to permit sufficient movement of the fingertab 80 and actuation arm 48 to align the first 64 and second 66 slots in the same direction. Most preferably, the edge-panel 58 will include a depression 84 defined in part by a floor 86 in which the second slot 66 and opening 82 reside. The depression 84 permits closure of the door 2 without interference with the parts of the switch by the doorframe surrounding the doorway.

Figure 2:
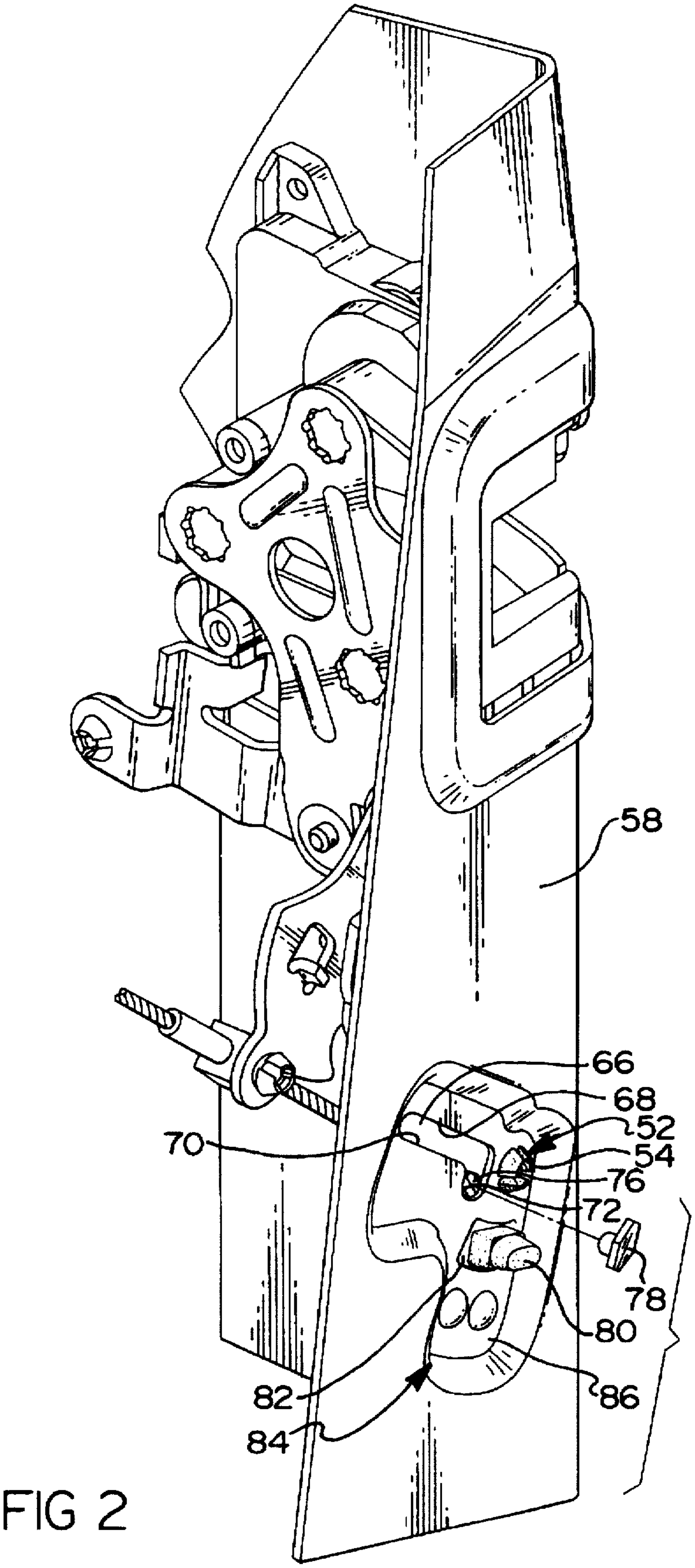
FIG. 2 is a partially broke away isometric view, from a second direction, of the child-proof latch, cable system and handle mechanism of FIG. 1.

The aforesaid child-proof latch operates as follows. To disable the latch 2, the fingertab 80 is moved clockwise (i.e., when facing the edge-panel 58) to rotate the actuation arm 48 of the switch 46 so as align the first 64 and second 66 slots in the same direction such that the stud 76 on the fitting 74 can slide freely in the two slots 64 and 66. When the slots 64 and 66 are thus aligned and the handle 16 is pulled outwardly by the vehicle entrant, the end 36 of the cable 32 moves freely toward the second end 42 of the sheath 30, and no tensioning or significant straightening of the cable 32 occurs. As a result, no significant straightening of the sheath 30 occurs as is needed to actuate the trigger 12. On the other hand, as shown in FIG. 2, to enable the latch 4 to be disengaged from the striker 8, the fingertab 80 is moved counterclockwise to rotate the actuation arm 48 of the switch 46 so as misalign the first 64 and second 66 slots from the same direction, and cause the trapping end 84 of the first slot 64 to push the stud 76 down into the recess 72 in the second slot 66 and retain it therein against longitudinal movement. When the stud 76, and hence the second end 36 of the cable 32, is so trapped and the handle 16 is actuated by pulling on the grasping portion 22 (and hence tensioning the cable 32), the cable system 14 is caused to straighten significantly thereby straightening the sheath 30 and causing it (1) to move to a position 17 having an arc whose radius is greater than the first radius, and (2) to push on and actuate the trigger 12. A particular advantage of this preferred embodiment is that the switch 12 merely serves to move the stud 76 on the second end 36 of the cable 32 into and out of a trapped/anchored position on the door 2, and does not itself bear any of the load imposed by tensioning of the cable. As it is not load-bearing, the switch 12 may be made of a lightweight, inexpensive, moldable plastic.

While the invention has been disclosed primarily in terms of a specific embodiment thereof it is not intended to be limited thereto but rather only to the extent set forth hereafter in the claims which follows.

We claim:

1. In a cable-driven door latch and handle mechanism comprising a latchbolt for engaging a striker on a doorframe to prevent unintended opening of the door associated with said latch, a trigger for actuating said latchbolt, a handle remote from said trigger for actuating said trigger, a flexible cable extending between said handle and said door latch, and a flexible sheath encasing said cable for actuating said trigger when said cable is tensioned by said handle, a first end of said cable affixed to said handle for movement with said handle, a first end of said sheath anchored against movement adjacent said first end of said cable, and a second end of said sheath affixed to said trigger, the improvement comprising: a second end of said cable being selectively (1) anchored against longitudinal movement when the ability to actuate said trigger by said sheath is enabled, and (2) released for movement with respect to said trigger when the ability to actuate said trigger by said sheath is disabled.

2. The door latch and handle mechanism of claim 1 including a selector switch engaging a fitting on said second end of said cable for selectively anchoring said second end against movement so as to enable said ability to actuate said trigger by said sheath, and for releasing said second end of said cable for movement relative to said trigger to disable said ability to actuate said trigger by said sheath.

3. The door latch and handle mechanism of claim 2 wherein said selector switch is a lever mounted on said door and rotateable between cable-trapping and cable-releasing positions, a first slot in said lever through which said fitting slides when said ability to actuate said trigger by said sheath is disabled, said .slot having a free end adjacent said trigger and a trapping end opposite said free end for anchoring said second end of said cable against movement when said ability to actuate said trigger by said sheath is enabled.

4. The door latch and handle mechanism according to claim 3 wherein said door includes an edge-panel, and a second slot in said edge-panel proximately abreast of said first slot, said second slot being defined by a pair of walls between which said fitting slides when said first and second slots are aligned in substantially the same direction and said ability to actuate said trigger is disabled.

5. The door latch and handle mechanism according to claim 4 including a recess in one of said walls adjacent said trapping end of said first slot for receiving and retaining said fitting against movement in said slots when said ability to actuate said trigger by said sheath is enabled, said fitting being trapped in said recess by said locking end of said first slot when said lever is rotated to said cable-trapping position such that said slots are not aligned in said direction.

6. The door latch and handle mechanism according to claim 4 including a depression in said edge-panel, a floor defining said depression, and said second slot is in said floor.

7. The door latch and handle mechanism according to claim 4 including an opening in said edge-panel, and a fingertab on said lever extending through said opening to the exterior of said edge-panel for manually moving said lever between said cable-trapping and cable-releasing positions.

* * * * *